(12) United States Patent
Alquier et al.

(10) Patent No.: US 10,190,703 B2
(45) Date of Patent: Jan. 29, 2019

(54) SUPPORT FOR A CONDUIT

(71) Applicant: Airbus Operations SAS, Toulouse (FR)

(72) Inventors: Bruno Alquier, Blagnac (FR); Clément Rivera, Saint Raphael (FR); Gérard Millet, Pibrac (FR)

(73) Assignee: Airbus Operations SAS, Toulouse (FR)

( * ) Notice: Subject to any disclaimer, the term of this patent is extended or adjusted under 35 U.S.C. 154(b) by 115 days.

(21) Appl. No.: 15/294,353

(22) Filed: Oct. 14, 2016

(65) Prior Publication Data

US 2017/0108145 A1     Apr. 20, 2017

(30) Foreign Application Priority Data

Oct. 16, 2015   (FR) ..................................... 15 59838

(51) Int. Cl.
| | | |
|---|---|---|
| *F16L 3/10* | (2006.01) | |
| *F16L 3/12* | (2006.01) | |
| *F16L 3/16* | (2006.01) | |

(52) U.S. Cl.
CPC ............... *F16L 3/1207* (2013.01); *F16L 3/10* (2013.01); *F16L 3/1091* (2013.01); *F16L 3/16* (2013.01)

(58) Field of Classification Search
CPC ... F16L 3/10; F16L 3/1091; F16L 3/12; F16L 3/1207
USPC .... 248/65, 67.5, 70, 72, 73, 74.1, 74.4, 74.5
See application file for complete search history.

(56) References Cited

U.S. PATENT DOCUMENTS

| | | | | |
|---|---|---|---|---|
| 622,739 | A * | 4/1899 | Wahlert .................... | F16L 3/10 248/74.4 |
| 1,788,366 | A * | 1/1931 | Anderson ............ | H02G 3/0616 174/665 |
| 3,516,630 | A * | 6/1970 | Janssens ............. | F16C 11/0614 248/55 |
| 3,964,773 | A * | 6/1976 | Stade .................. | F01N 13/1805 285/367 |
| 4,209,155 | A * | 6/1980 | Florian ..................... | F16L 3/11 248/62 |
| 4,490,888 | A | 1/1985 | Levant | |
| 4,921,191 | A * | 5/1990 | Herschler ................. | F16L 3/12 248/70 |
| 5,215,281 | A * | 6/1993 | Sherman ............... | F16L 55/035 248/219.4 |

(Continued)

OTHER PUBLICATIONS

The Free Dictionary, Apr. 17, 2017, http://www.thefreedictionary.com/diameter.*
French Search Report, dated Aug. 30, 2016, priority document.

*Primary Examiner* — Jonathan Liu
*Assistant Examiner* — Guang H Guan
(74) *Attorney, Agent, or Firm* — Greer, Burns & Crain, Ltd.

(57) ABSTRACT

A support for a pipe which comprises a body which comprises a through-orifice for the pipe. The through-orifice has a diameter which is greater than an external diameter of the pipe. At least one base of the support is configured so as to be in contact with and connected to a fixing surface. A first ring and a second ring each have an eccentric orifice and are configured so as to be fitted one into the other in the orifice of the body about the pipe when the support is put in position. By rotating at least one of the first and second rings, the position of the axis of the pipe may be adjusted radially relative to the support.

9 Claims, 2 Drawing Sheets

(56) References Cited

U.S. PATENT DOCUMENTS

| | | | | |
|---|---|---|---|---|
| 5,297,896 | A * | 3/1994 | Webb | B67D 7/78 138/114 |
| 5,551,783 | A * | 9/1996 | Whitney | B60K 17/24 384/536 |
| 5,950,277 | A * | 9/1999 | Tallmadge | F16B 5/0258 16/2.1 |
| 6,089,615 | A * | 7/2000 | Jappinen | F16L 41/14 285/125.1 |
| 6,234,541 | B1 * | 5/2001 | Wagner | F01N 13/1805 24/277 |
| 6,485,241 | B1 * | 11/2002 | Oxford | B60R 11/0217 16/2.1 |
| 6,717,055 | B2 * | 4/2004 | Kato | H02G 3/32 173/136 |
| 7,044,646 | B1 * | 5/2006 | Aiken | B60K 17/24 384/536 |
| 7,534,965 | B1 * | 5/2009 | Thompson | H02G 3/22 16/2.1 |
| 7,770,848 | B2 * | 8/2010 | Johnson | F16L 3/1207 248/65 |
| 8,307,592 | B2 * | 11/2012 | Chang | F16L 5/14 285/139.1 |
| 8,602,798 | B2 * | 12/2013 | Downing | F16L 3/00 248/65 |
| 8,985,533 | B2 * | 3/2015 | Edmond | F16L 3/227 248/68.1 |
| 9,038,968 | B2 * | 5/2015 | Hennon | F16L 3/1091 248/65 |
| 9,061,768 | B2 * | 6/2015 | Hansom | B64D 37/00 |
| 9,447,899 | B2 * | 9/2016 | Minami | B64D 37/005 |
| 9,731,586 | B2 * | 8/2017 | Sakamoto | F16F 1/3849 |
| 2004/0160055 | A1 * | 8/2004 | Newton | F16L 5/06 285/21.1 |
| 2009/0140106 | A1 | 6/2009 | Johnson et al. | |
| 2013/0075150 | A1 * | 3/2013 | Newbolt | B64D 45/02 174/360 |
| 2013/0187013 | A1 | 7/2013 | Minami | |
| 2016/0356403 | A1 * | 12/2016 | Perrigo | B64D 37/00 |
| 2017/0108145 | A1 * | 4/2017 | Alquier | F16L 3/10 |
| 2018/0023729 | A1 * | 1/2018 | Alquier | F16L 3/10 248/74.4 |

\* cited by examiner

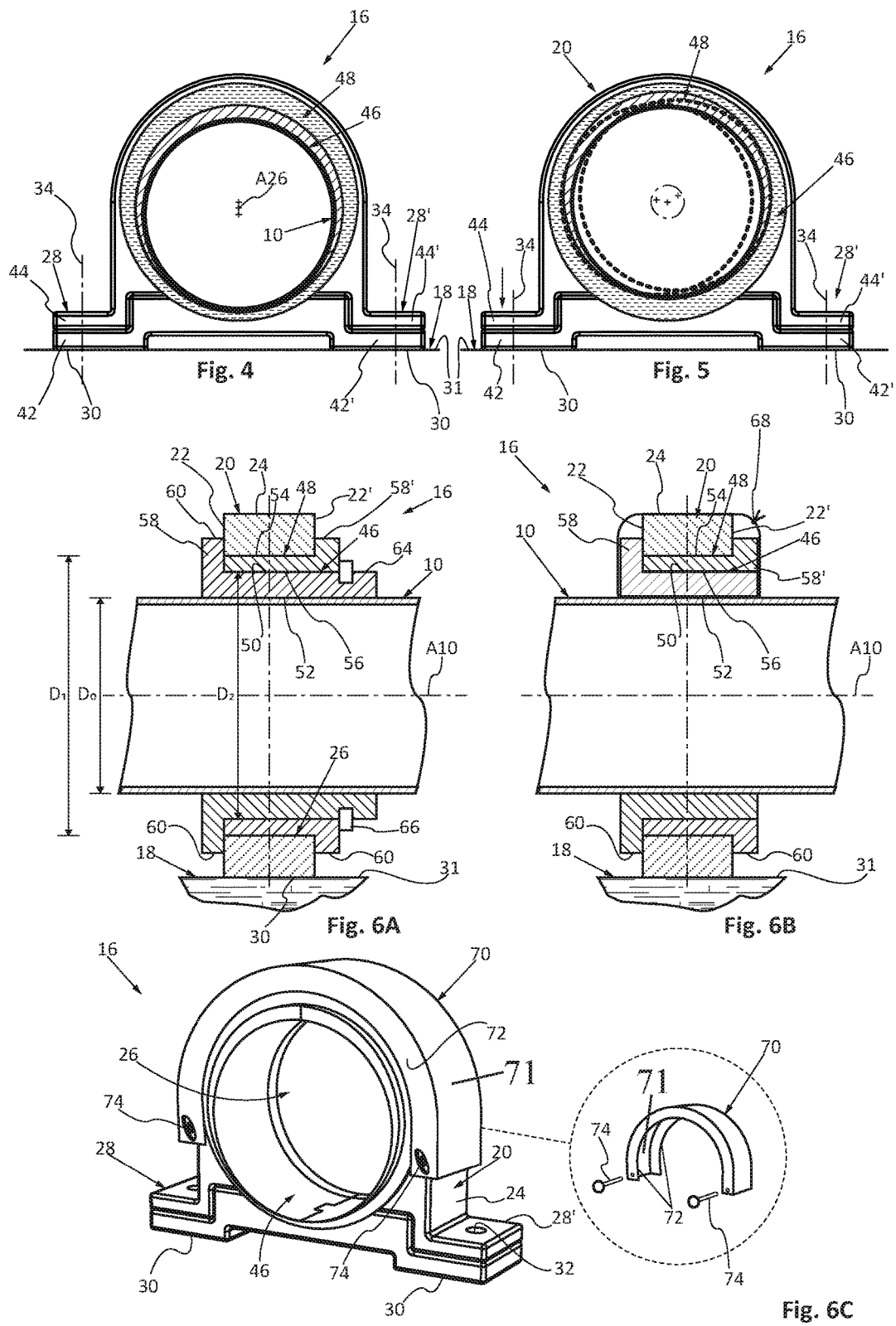

SUPPORT FOR A CONDUIT

CROSS-REFERENCES TO RELATED APPLICATIONS

This application claims the benefit of the French patent application No. 1559838 filed on Oct. 16, 2015, the entire disclosures of which are incorporated herein by way of reference.

BACKGROUND OF THE INVENTION

The present application relates to a support for a pipe, for example a pipe for a fluid circuit.

An aircraft comprises at least one fluid circuit for channeling the fuel from a tank to the engines.

This fluid circuit comprises, amongst other things, a succession of pipes arranged end-to-end. Two successive pipes are connected by a connector which comprises a sleeve, the ends of the pipes being fitted therein. In order to ensure the sealing, an annular seal is interposed between the end of each pipe and the sleeve of the connector.

According to the known embodiments, the connectors are configured so as to compensate for a possible angular error and to permit a slight axial movement between two successive pipes.

At each end of the pipe, the connection between the pipe and the connector is of the linear type. As a result, the mounting of a pipe between two connectors is implemented without the occurrence of stress.

In certain circumstances, it is necessary to provide a support to support the pipe so as to limit, in particular, the transfer of load onto the joints of the connectors.

According to one embodiment, each support comprises a collar which surrounds the pipe section and a base which connects the collar to a structure of the aircraft.

In spite of the care given to the mounting, the axis of the collar is not generally aligned with the straight line passing through the centers of the linear connections provided at each end of the pipe. This misalignment produces stresses in the region of the joints of the connectors which causes the occurrence of wear in these joints.

SUMMARY OF THE INVENTION

The present invention aims to remedy the drawbacks of the prior art.

To this end, the subject of the invention is a support for a pipe, the support comprising a body with an orifice and at least one base.

The support is characterized in that it comprises a first ring and a second ring which each have an eccentric orifice and which are configured to be fitted into one another in the orifice of the body, that is, one of the rings is fitted into the other.

By rotating at least one of the first and second rings, the position of the axis of the pipe is adjusted radially relative to the support. This adjustment makes it possible to avoid applying stresses to the connectors present at each end of the pipe and thus to limit the risk of wear to the joints of the connectors.

According to a further feature, each ring comprises a flange which is configured so as to be positioned outside the body.

Preferably, the flange of the first ring is in contact with a first face of the body and the flange of the second ring is in contact with a second face of the body which is parallel to and opposite the first face of the body.

Advantageously, the flange of at least one of the first and second rings comprises at least one gripping means which is configured so as to permit the handling and the pivoting of the ring.

In order to simplify the mounting, at least one of the rings is produced in two parts, the two parts of a ring having complementary shapes which are configured to block a translation in a longitudinal direction of one of the two parts relative to the other part when the two parts of the ring are assembled.

According to a further feature, the support comprises a system for retaining the first and second rings in the orifice of the body.

According to a first variant, the first ring has an end which protrudes relative to the second ring and a flange in contact with a first face of the body, the second ring is positioned around the first ring and comprises a flange in contact with a second face of the body which is parallel to and opposite the first face of the body and the retaining system comprises a stop which is connected to the end of the first ring and positioned such that the second ring is immobilized between the flange of the first ring and the stop.

According to a further variant, the retaining system comprises a link which encircles the first ring, the second ring and the body, passing through the orifice of the first ring.

According to a further variant, the retaining system comprises a U-shaped cap with two parallel arms, the cap being configured to surmount the support so that the first and second rings are immobilized between the arms.

The subject of the invention is also a pipe provided with a support according to one of the above features.

BRIEF DESCRIPTION OF THE DRAWINGS

Further features and advantages will be disclosed from the following description of the invention, the description being provided solely by way of example, with reference to the accompanying drawings, in which:

FIG. 4 is a front view of the support visible in FIG. 2, FIG. 5 is a front view of the support visible in FIG. 2, which illustrates the possibilities of adjustment, FIG. 6A is a longitudinal section of a support, which illustrates a first variant of a retaining system, FIG. 6B is a longitudinal section of a support, which illustrates a second variant of a retaining system, and FIG. 6C is a perspective view of a support, which illustrates a third variant of a retaining system.

DETAILED DESCRIPTION OF THE PREFERRED EMBODIMENTS

Figure 1:
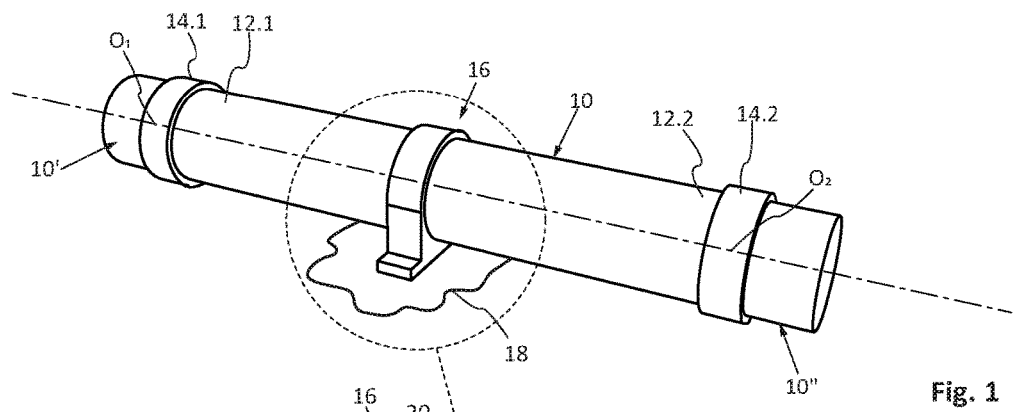
FIG. 1 is a perspective view of a pipe provided with a support which illustrates the context of the invention.

A part of a fluid circuit which comprises a pipe 10 positioned between an upstream pipe 10' and a downstream pipe 10" has been shown in FIG. 1.

The pipe 10 comprises a first end 12.1 connected to the upstream pipe 10' by means of a first connector 14.1 and a second end 12.2 connected to the downstream pipe 10" by means of a second connector 14.2. According to one embodiment, each connector 14.1 and 14.2 comprises a sleeve, the first or second end 12.1, 12.2 of the pipe 10 being fitted therein. To ensure the sealing, each connector 14.1, 14.2 comprises a seal interposed between the end 12.1, 12.2 of the pipe 10 and the sleeve. According to this embodiment, at each of its first and second ends 12.1 and 12.2, the pipe 10 comprises a connection with the first or second connector 14.1, 14.2 which is of the linear type. The linear connections present at the ends of the pipe 10 are illustrated by their centers respectively O1 and O2 in FIG. 1.

As illustrated in FIG. 6A, the pipe 10 has an external diameter D0 and an axis A10.

Figure 2:
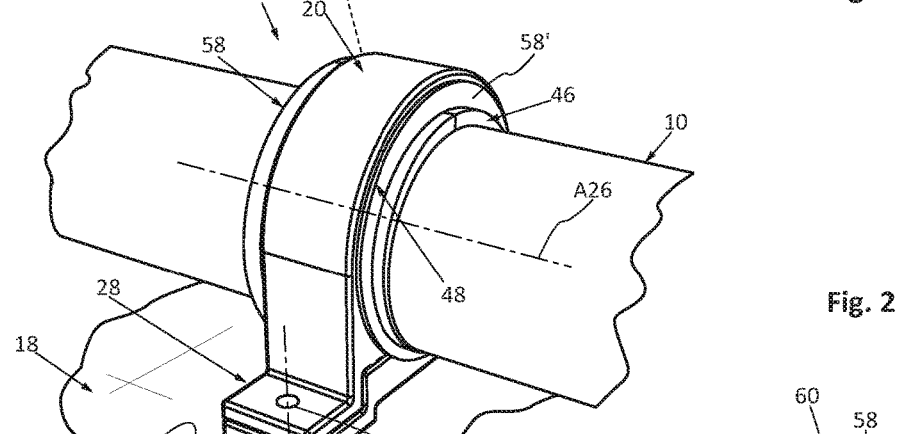
FIG. 2 is a perspective view illustrating in detail a support connected to the pipe, which illustrates an embodiment of the invention.

In FIG. 1, the pipe 10 is provided with a support 16 which connects the pipe 10 to a structure 18. The support 16 is illustrated in detail in FIGS. 2 and 3.

The support 16 comprises a body 20 delimited by the first and second faces 22, 22' parallel to one another, an edge 24 which connects the first and second faces 22, 22' and a through-orifice 26 which opens in the region of each face 22, 22'.

Preferably, the first and second faces 22, 22' are planar and the orifice 26 is cylindrical and comprises an axis A26 perpendicular to the first and second faces 22, 22'. For the remainder of the description, the longitudinal direction is parallel to the axis A26 of the orifice 26. A longitudinal plane contains the axis A26 of the orifice 26. A transverse plane is perpendicular to the axis A26 of the orifice 26. A radial direction is perpendicular to the axis A26 of the orifice 26.

According to one feature of the invention, this orifice 26 has a diameter D1 which is greater than the external diameter D0 of the pipe 10, as illustrated in FIG. 6A.

According to one embodiment, the body 20 comprises two fixing lugs 28, 28' arranged symmetrically relative to a longitudinal plane. Each fixing lug 28, 28' comprises a base 30 which is configured to bear against the structure 18 and a through-hole 32 to house a fixing element indicated by an axis 34.

Whatever the embodiment, the body 20 comprises at least one base 30 which is configured so as to be in contact with a fixing surface 31 of the structure 18.

Advantageously, the body 20 is produced in at least two parts 36, 38 which comprise a joining plane which is secant with the orifice 26 in order to be able to position the body 20 around the pipe 10 without having to pull it on from one end of the pipe 10. Thus, the support 16 is able to be positioned even when the pipe 10 is already connected at each of its ends to other pipes.

According to one embodiment, the body 20 comprises a first part 36 and a second part 38. The first part 36 comprises a base 40 which comprises a portion of the wall of the orifice 26 and which connects two first lugs 42, 42'. In addition, the second part 38 has a reverse U-shape with, on either side, second lugs 44, 44' which are configured to be superposed on the first lugs 42, 42' of the first part 36. Thus, when the first and second parts 36 and 38 are assembled, the first and second lugs 42, 42', 44, 44' are superposed and form the fixing lugs 28, 28'.

According to this embodiment, the fixing elements 34 make it possible not only to fix the support 16 to the structure 18 but also to retain the first and second assembled parts.

According to a further feature of the invention, the support 16 comprises a first ring 46 and a second ring 48.

The first ring 46 comprises a cylindrical external wall 50 and a cylindrical internal wall 52 which delimits an orifice, a diameter thereof being equal to the external diameter D0 of the pipe 10.

The second ring 48 comprises a cylindrical external wall 54, a diameter thereof being equal to the diameter D1 of the orifice 26 of the body 20 and a cylindrical internal wall 56 which delimits an orifice having a diameter D2 which is equal to the diameter of the cylindrical external wall 50 of the first ring 46.

For each ring 46, 48, the cylindrical internal wall 52, 56 is eccentric relative to the cylindrical external wall 50, 54. The distance between the axis of the cylindrical internal wall 52, 56 and the axis of the cylindrical external wall 50, 54 is called eccentricity. Advantageously, each ring 46 or 48 comprises a flange 58, 58' which is configured to be positioned outside the body 20. Thus, the ergonomics of the support 16 is improved and the handling of the first and second rings 46, 48 is facilitated.

According to one embodiment, each ring 46, 48 has an approximately tubular shape with at one end the flange 58, 58'.

Whatever the embodiment, for at least one of the first and second rings 46, 48, the flange 58, 58' comprises at least one gripping means permitting the handling and pivoting of the corresponding ring 46, 48.

According to one embodiment, for at least one of the first and second rings 46, 48, the flange 58, 58' comprises a knurled peripheral edge 60 as a gripping means which is configured so as to permit the handling and pivoting of at least one of the rings. Other shapes or configurations of the outer surface of the first and second rings can be provided, as is known in the art, to permit the handling and pivoting of at least one of the rings.

According to a second embodiment, for at least one of the first and second rings 46, 48, the flange 58, 58' comprises at least one flattened portion.

Advantageously, at least one of the rings 46 (or 48) is produced in two parts 46.1, 46.2 (or 48.1, 48.2) to permit the mounting of the rings 46, 48 around the pipe 10 without having to dismantle one of the ends thereof.

According to one embodiment, the two parts 46.1, 46.2 (or 48.1, 48.2) are preferably approximately symmetrical relative to a longitudinal plane.

Preferably for each ring 46 (or 48), the two parts 46.1, 46.2 (or 48.1, 48.2) have complementary shapes 62 in order to block a translation in the longitudinal direction of one of the two parts relative to the other part when the two parts of the ring are assembled.

Figure 3:
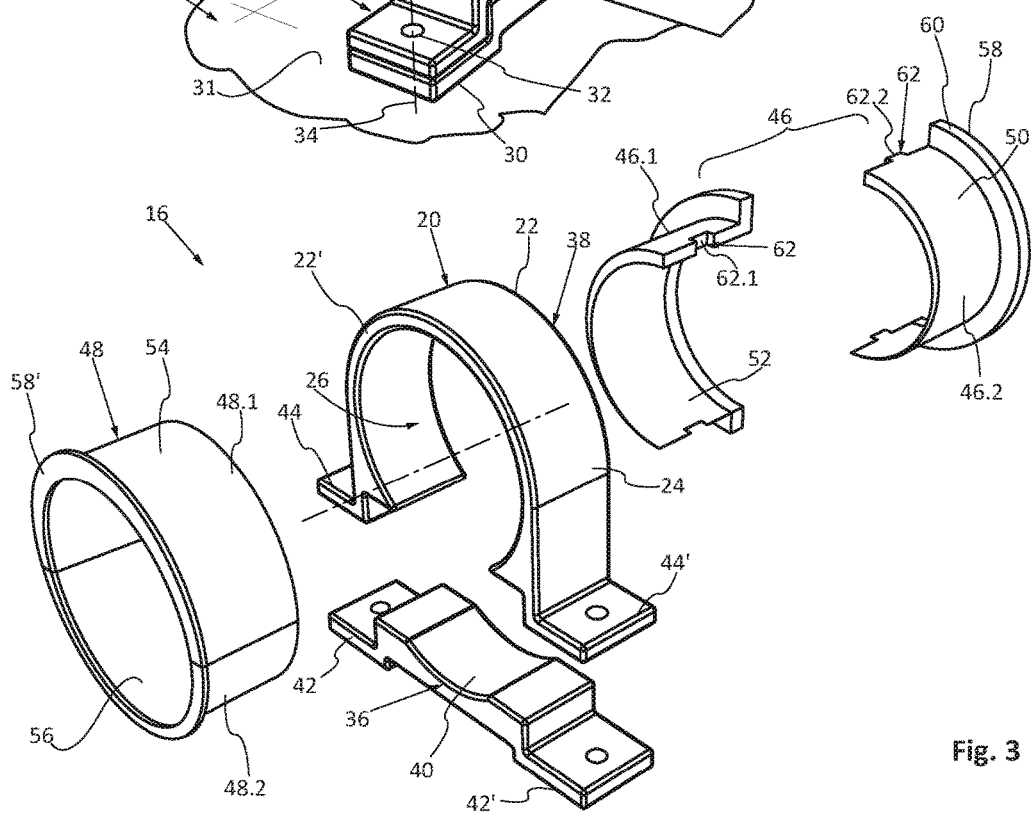
FIG. 3 is an exploded view of the different elements of the support visible in FIG. 2, which illustrates an embodiment of the invention.

By way of example of this complementarity, the ring 46 comprises a female part 46.1 and a male part 46.2, visible in FIG. 3. The female part comprises an indentation 62.1 which is configured to receive a protruding part 62.2 present on the male part 46.2.

The mounting of the support 16 is now described.

In a first step, the two parts of the body 20 are positioned about the pipe 10.

Subsequently, the second ring 48 is positioned in the orifice 26 of the body 20, and then the first ring 46 is positioned between the second ring 48 and the pipe 10.

When the first and second rings 46 and 48 are nested in one another and in the orifice 26 of the body 20, the flange 58 of the first ring 46 bears against the first face 22 of the body 20 and the flange 58' of the second ring 48 bears against the second face 22' of the body 20.

After the mounting of the support 16 on the pipe 10, the first and second rings 46, 48 each have an orifice which is eccentric relative to the axis A10 of the pipe 10.

At least one of the first and second rings 46, 48 is pivoted until the bases 30, 30' of the fixing lugs 28, 28' of the body 20 are in contact with the fixing surface 31 of the structure 18.

Once the support 16 is adjusted, the fixing elements 34 are positioned so as to fix the support 16 to the structure 18.

By pivoting the first and/or second ring 46, 48 around the pipe 10, it is possible to displace radially the axis A10 of the pipe 10 relative to the axis A26 of the orifice 26 of the body 20, as illustrated in FIG. 5. Thus, even if the axis A26 of the orifice 26 is offset radially relative to the straight line passing through the centers O1 and O2 of the connections present at the ends of the pipe 10, it is possible to align the axis A10 of the pipe with the straight line passing through the centers O1 and O2 using the first and second rings 46 and 48. In this manner, the joints of the connectors 14.1 and 14.2 are subjected to less stress.

As indicated in FIG. 5, by pivoting the first and/or second ring 46, 48 around the pipe 10, the axis A10 of the pipe 10 may be displaced in a cylinder which is coaxial with the axis A26 of the orifice 26 of the body 20, the cylinder having a diameter which is a function of the values of the eccentricity of the rings 46 and 48.

According to a further feature, the support 16 comprises a system for retaining the first and second rings 46, 48 in the orifice 26 of the body 20.

According to a first variant visible in FIG. 6A, the first ring 46 has a length which is greater than the second ring 48 such that the second end 64 of the first ring 46 protrudes relative to the second ring 48. In addition, the flange 58 of the first ring 46 has a diameter which is sufficient to bear against the first face 22 of the body 20 and the flange 58' of the second ring 48 has a diameter which is sufficient to bear against the second face 22' of the body 20. According to this first variant, the retaining system comprises a stop 66 which is connected to the second end 64 of the first ring 46, the stop 66 being positioned such that the second ring 48 is immobilized between the stop 66 and the flange 58 of the first ring 46.

According to one embodiment, this stop 66 is a circlip which is configured to be accommodated in a groove provided in the region of the cylindrical external wall 50 of the first ring 46.

According to a further embodiment, this stop 66 is a nut which is configured to be screwed onto the cylindrical external wall 50 of the first ring 46.

According to a further embodiment, the stop 66 is a clamping collar which is positioned and clamped around the second end 64 of the first ring 46.

According to a second variant visible in FIG. 6B, the retaining system comprises a link 68 which passes into the orifice of the first tube 46 and which encircles the first ring 46, the second ring 48 and the body 20.

According to a third variant visible in FIG. 6C, the retaining system comprises a U-shaped cap 70 including a main body 71 with two parallel arms 72. The main body 71 is a arranged between the two parallel arms 72 in a direction parallel to a longitudinal axis of the orifice 26. The cap 70 is configured to surmount the support 16 so that the first and second rings 46, 48 are immobilized between the arms 72.

Preferably, the retaining system also comprises at least one pin 74 for immobilizing the cap 70 on the body 20.

The support 16 of the invention makes it possible to compensate for possible bending of the pipe without producing stresses on the pipe and on the connectors present at each end of the pipe.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A support for a pipe, the support comprising:
   a body delimited by a first face and a second face, the body having an orifice extending between the first face and the second face, wherein the body comprises a first part and a second part, wherein the first part of the body comprises a base which forms a portion of the orifice of the body, and wherein the first part and the second part together define the first face and the second face,
   a first ring and a second ring which each have an eccentric orifice and which are configured so as to be fitted one into the other in the orifice of the body, wherein each ring comprises a flange, wherein the flange of the first ring is in direct contact with the first face of the body and the flange of the second ring is in direct contact with the second face of the body, and wherein the second face of the body is parallel to and opposite the first face of the body, and,
   a system for retaining the first and second rings in the orifice of the body comprising a U-shaped cap, the U-shaped cap including a main body portion and two parallel arms, wherein the main body portion is arranged between the two parallel arms in a direction parallel to a longitudinal axis of the orifice of the body, and wherein the U-shaped cap is configured to surmount the support so that the first and second rings are immobilized between the two parallel arms.

2. The support as claimed in claim 1, wherein the flange of at least one of the first and second rings comprises at least one gripping means configured to permit handling and pivoting of the at least one of the first and second rings.

3. The support as claimed in claim 1, wherein at least one of the first and second rings comprises two parts, the two parts of the at least one of the first and second rings having complementary shapes and being configured to block a translation in a longitudinal direction of one of the two parts relative to the other of the two parts when the two parts are assembled.

4. A pipe and a support, the support comprising:
   a body delimited by a first face and a second face, the body having an orifice extending between the first face and the second face, wherein the body comprises a first part and a second part, wherein the first part of the body comprises a base which forms a portion of the orifice of the body, and wherein the first part and the second part together define the first face and the second face,
   a first ring and a second ring which each have an eccentric orifice and which are configured so as to be fitted one into the other in the orifice of the body,
   a U-shaped cap including a U-shaped main body portion and two parallel arms, wherein the U-shaped main body portion is arranged between the two parallel arms in a direction parallel to a longitudinal axis of the orifice of the body, and wherein the U-shaped cap is secured to the body with at least one pin, and, wherein the pipe has an external diameter which is less than a diameter of the orifice of the body of the support, and wherein the first ring and the second ring of the support are fitted one into the other in the orifice of the body and around the pipe when the support is put in position.

5. The support as claimed in claim 4, wherein one of the first and second rings comprises two parts, the two parts of the one of the first and second rings having complementary shapes and being configured to block a translation in a longitudinal direction of one of the two parts relative to the other of the two parts when the two parts are assembled.

6. The support as claimed in claim 5, wherein the other of the first and second rings comprises two parts.

7. The support as claimed in claim 5, wherein the first and second rings each comprise an approximately tubular shape with a flange at one end.

8. The support as claimed in claim 7, wherein the flange of the first ring comprises a knurled peripheral edge.

9. A fluid circuit comprising:
a pipe having an axis and being connected at a first end to an upstream pipe with a first connector and at a second end to a downstream pipe with a second connector; and,
at least one support comprising a body, a first ring, and a second ring, each ring comprising a flange and an eccentric orifice, wherein the first ring is arranged in an orifice of the body and the second ring is arranged in the eccentric orifice of the first ring, wherein the body comprises a first part and a second part, and wherein the first part of the body comprises a base which forms a portion of the orifice of the body, wherein each ring is configured to be rotated so as to align the axis of the pipe with at least one of the first and second connectors, wherein the first part and the second part together define a first face and a second face, wherein the second face is opposite the first face, and wherein the flange of the first ring directly contacts the first face of the body and the flange of the second ring directly contacts the second face of the body, and wherein the at least one support further comprises a system for retaining the first and second rings in the orifice of the body, wherein the system for retaining the first and second rings in the orifice of the body includes a U-shaped cap, wherein the U-shaped cap has a main body portion and two parallel arms, wherein the main body portion is arranged between the two parallel arms in a direction parallel to a longitudinal axis of the orifice of the body, and wherein the U-shaped cap is configured to surmount the at least one support so that the first and second rings are immobilized between the two parallel arms.

* * * * *